(12) United States Patent
Thomas

(10) Patent No.: US 12,321,307 B2
(45) Date of Patent: *Jun. 3, 2025

(54) PCI EXPRESS TO PCI EXPRESS BASED LOW LATENCY INTERCONNECT SCHEME FOR CLUSTERING SYSTEMS

(71) Applicant: Mammen Thomas, Seattle, WA (US)

(72) Inventor: Mammen Thomas, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/525,837

(22) Filed: Nov. 12, 2021

(65) Prior Publication Data

US 2022/0100694 A1 Mar. 31, 2022

Related U.S. Application Data

(63) Continuation of application No. 15/175,800, filed on Jun. 7, 2016, now Pat. No. 11,194,754, which is a continuation of application No. 14/588,937, filed on Jan. 3, 2015, now Pat. No. 9,519,608, which is a continuation of application No. 13/441,883, filed on Apr. 8, 2012, now abandoned, which is a continuation of application No. 11/242,463, filed on Oct. 4, 2005, now Pat. No. 8,189,603.

(51) Int. Cl.
*G06F 13/42* (2006.01)
*G06F 13/40* (2006.01)
*H04L 49/40* (2022.01)

(52) U.S. Cl.
CPC ...... *G06F 13/4282* (2013.01); *G06F 13/4022* (2013.01); *G06F 13/4221* (2013.01); *H04L 49/40* (2013.01); *G06F 2213/0026* (2013.01)

(58) Field of Classification Search
CPC .......... G06F 13/4282; G06F 13/4022; G06F 13/4221; G06F 2213/0026; H04L 49/40
See application file for complete search history.

(56) References Cited

U.S. PATENT DOCUMENTS

| 7,062,594 B1 * | 6/2006 | Sardella | G06F 13/4027 |
| | | | 710/316 |
| 9,519,608 B2 * | 12/2016 | Thomas | G06F 13/4282 |
| 11,194,754 B2 * | 12/2021 | Thomas | G06F 13/4221 |
| 2004/0039986 A1 * | 2/2004 | Solomon | H04L 49/252 |
| | | | 710/316 |

(Continued)

*Primary Examiner* — Chirag G Shah
*Assistant Examiner* — Joshua Smith

(57) ABSTRACT

PCI-Express (PCIE) is a hierarchical Bus or-I/O interconnect standard-used for interconnection between a root-complex of a PCIE enabled computing system and peripheral devices over the bus that may include hierarchically connected and controlled PCIE switches.

The current application describes a PCIE based interconnect scheme for a plurality of PCIE enabled computing systems connected in a cluster using a network switch, having a plurality of inbound PCIE ports, The network switch is independently configured and controlled as a hub of a star interconnection topology for switching and data-transfer between its inbound PCIE ports. Connecting an outbound PCIE port, enabled for interconnection, on each of the plurality of the PCIE enabled computing systems of the cluster to one of the plurality of inbound PCIE ports on the network switch the star interconnection for communication and data-transfer between the PCIE enabled systems of the cluster through the network switch is enabled.

3 Claims, 2 Drawing Sheets

(56) References Cited

U.S. PATENT DOCUMENTS

| | | | |
|---|---|---|---|
| 2004/0230735 A1* | 11/2004 | Moll | G06F 13/4022 |
| | | | 710/312 |
| 2004/0268015 A1* | 12/2004 | Pettey | H04L 49/602 |
| | | | 710/313 |
| 2005/0220114 A1* | 10/2005 | Romano | H04L 47/527 |
| | | | 370/412 |
| 2005/0238035 A1* | 10/2005 | Riley | H04L 49/35 |
| | | | 370/401 |
| 2006/0004837 A1* | 1/2006 | Genovker | H04L 45/28 |
| | | | 707/999.102 |
| 2006/0015674 A1* | 1/2006 | Murotake | H04B 1/406 |
| | | | 711/101 |
| 2006/0114918 A1* | 6/2006 | Ikeda | H04L 45/02 |
| | | | 370/408 |
| 2007/0019637 A1* | 1/2007 | Boyd | G06F 13/4045 |
| | | | 370/360 |
| 2008/0209099 A1* | 8/2008 | Kloeppner | G06F 13/4022 |
| | | | 710/314 |
| 2011/0202701 A1* | 8/2011 | Maitra | G06F 13/4022 |
| | | | 710/316 |
| 2022/0374388 A1* | 11/2022 | Thomas | H04L 49/40 |
| 2023/0315674 A1* | 10/2023 | Thomas | H04L 49/40 |
| | | | 370/401 |

\* cited by examiner

A Cluster enlargement using switch to switch interconnect

PCI EXPRESS TO PCI EXPRESS BASED LOW LATENCY INTERCONNECT SCHEME FOR CLUSTERING SYSTEMS

CROSS REFERENCE TO RELATED APPLICATIONS

This application is a continuation of U.S. patent application Ser. No. 15/175,800 titled "PCI Express.to PCI Express based low latency interconnect scheme for clustering systems" filed on Jun. 7, 2016, which is a continuation of U.S. application Ser. No. 14/588,937 titled "PCI Express.to PCI Express based low latency interconnect scheme for clustering systems" filed on Jan. 3, 2015, currently U.S. Pat. No. 9,519,608 which is a continuation of U.S. patent application Ser. No. 13/441,883 titled "PCI Express to PCI Express based low latency interconnect scheme for clustering systems" filed on Apr. 8, 2012, which was abandoned, which is a continuation of U.S. patent application Ser. No. 11/242,463 titled "PCI Express to PCI Express based low latency interconnect scheme for clustering systems" filed on Oct. 4, 2005 which issued as U.S. Pat. No. 8,189,603 on May 29, 2012, all of which have a common inventor, and are hereby incorporated by reference for all that they contain.

TECHNICAL FIELD

The invention generally relates to providing high speed interconnect between systems within an interconnected cluster of systems.

BACKGROUND AND PRIOR ART

The need for high speed and low latency cluster interconnect scheme for data and information transport between systems have been recognized as a limiting factor to achieving high speed operation in clustered systems and one needing immediate attention to resolve. The growth of interconnected and distributed processing schemes have made it essential that high speed interconnect schemes be defined and established to provide the speeds necessary to take advantage of the high speeds being achieved by data processing systems and enable faster data sharing between interconnected systems.

There are today interconnect schemes that allow data transfer at high speeds, the most common and fast interconnect scheme existing today is the Ethernet connection allowing transport speeds from 10 MB to as high as 10 GB/sec. TCP/IP protocols used with Ethernet have high over-head with inherent latency that make it unsuitable for some distributed applications. Further TCP/IP protocol tends to drop data packets under high traffic congestion times, which require resend of the lost packets which cause delays in data transfer and is not acceptable for high reliability system operation. Recent developments in optical transport also provide high speed interconnect capability. Efforts are under way in different areas of data transport to reduce the latency of the interconnect as this is a limitation on growth of the distributed computing, control and storage systems. All these require either changes in transmission protocols, re-encapsulation of data or modulation of data into alternate forms with associated delays increase in latencies and associated costs.

DESCRIPTION

What is Proposed

PCI Express (PCIE) has achieved a prominent place as the I/O interconnect standard for use inside computers, processing system and embedded systems that allow serial high speed data transfer to and from peripheral devices. The typical PCIE provides 2.5-3.8 GB transfer rate per link (this may change as the standard and data rates change). The PCIE standard is evolving fast, becoming faster and starting become firm and used within more and more systems. Typically each PCIE based system has a root complex which controls all connections and data transfers to and from connected peripheral devices through PCIE peripheral end points or peripheral modules. What is disclosed is the use of PCIE standard based peripherals enabled for interconnection to similar PCIE standard based peripheral connected directly using data links, as an interconnect between multiple systems, typically through one or more network switches. This interconnect scheme by using PCIE based protocols for data transfer over direct physical connection links between the PCIE based peripheral devices, (see FIG. 1), without any intermediate conversion of the transmitted data stream to other data transmission protocols or encapsulation of the transmitted data stream within other data transmission protocols, thereby reducing the latencies of communication between the connected PCI based systems within the cluster. The PCIE standard based peripheral enabled for interconnection at a peripheral end point of the system, by directly connecting using PCIE standard based peripheral to PCIE standard based peripheral direct data link connections to the switch, provides for increase in the number of links per connection as bandwidth needs of system interconnections increase and thereby allow scaling of the band width available within any single interconnect or the system of interconnects as required.

Some Advantages of the Proposed Connection Scheme

1. Reduced Latency of Data transfer as conversion from PCIE to other protocols like Ethernet are avoided during transfer.
2. The number of links per connection can scale from X1 to larger numbers X32 or even X64 as PCIE capabilities increase to cater to the connection bandwidth needed. Minimum change in interconnect architecture is needed with increased bandwidth, enabling easy scaling with need.
3. Any speed increase in the link connection due to technology advance is directly applicable to the interconnection scheme.
4. Standardization of the PCIE based peripheral will make components easily available from multiple vendors, making the implementation of interconnect scheme easier and cheaper.
5. The PCIE based peripheral to PCIE based peripheral links in connections allow ease of software control and provide reliable bandwidth.
6. The use of standardized PCIE based peripheral modules enabled for interconnection as out bound port and the use of PCI-Express enabled port on the PCI-Express based network switch for interconnection between PCI-Express based network switches will allow for easy expansion of the cluster as computing needs grow.
7. The PCIE links and switches are agnostic to the data transmission and can be updated with new technology as they become available, to speed up data transfer between clustered PCI-Express enabled computing systems, (also called PCIE computing systems that are computing systems using PCI-Express bus for peripheral component interconnection, where the PCIE bus is under the control of a root complex of a respective computing system) without changing the capabilities and protocols of the interconnect scheme.

EXPLANATION OF NUMBERING AND LETTERING IN FIG. 1

(1) to (8): Number of Systems interconnected in FIG. 1 (9): Switch sub-system. (10): Software configuration and control input for the switch. (1a) to (8a): PCI Express based peripheral module (PCIE Modules) attached to systems. (1b) to (8b): PCI Express based peripheral modules (PCIE Modules) at switch. (1L) to (8L): PCIE based peripheral module to PCIE based peripheral module connections having n-links (n-data links)

EXPLANATION OF NUMBERING AND LETTERING IN FIG. 2

(12-1) and (12-2): clusters (9-1) and (9-2): interconnect modules or switch sub-systems. (10-1) and (10-2): Software configuration inputs (11-1) and (11-2): Switch to switch interconnect module in the cluster (11L): Switch to switch interconnection

DESCRIPTION OF INVENTION

PCI Express is a Bus or I/O interconnect standard for use inside the computer or embedded system enabling faster data transfers to and from peripheral devices. The standard is still evolving but has achieved a degree of stability such that other applications can be implemented using PCIE as basis. A PCIE based interconnect scheme to enable switching and inter-connection between multiple PCIE enabled systems each having its own PCIE root complex, such that the scalability of PCIE architecture can be applied to enable data transport between connected systems to form a cluster of systems, is proposed. These connected systems can be any computing, control, storage or embedded system. The scalability of the interconnect will allow the cluster to grow the bandwidth between the systems as they become necessary without changing to a different connection architecture.

Figure 1:
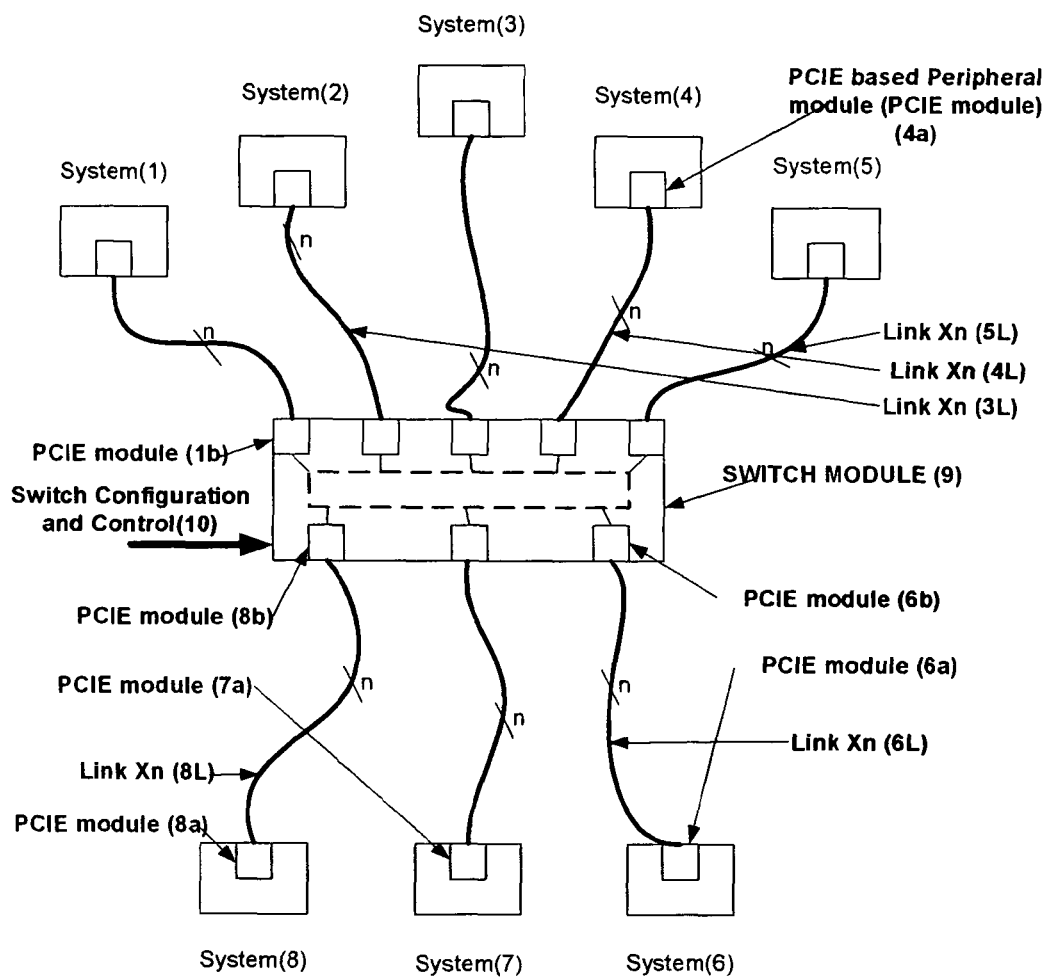
FIG. 1 Typical Interconnected (multi-system) cluster (shown with eight systems connected in a star architecture using direct connected data links between PCIE standard based peripheral to PCIE standard based peripheral)

FIG. 1 is a typical cluster interconnect. The Multi-system cluster shown consist of eight units or systems {(1) to (8)} that are to be interconnected. Each system is PCI Express (PCIE) based system with a PCIE root complex for control of data transfer to and from connected peripheral devices via PCIE peripheral modules as is standard for PCIE based systems. Each system to be interconnected has at least a PCIE based peripheral module {(1a) to (8a)} as an IO module, at the interconnect port enabled for system interconnection, with n-links built into or attached to the system. (9) is an interconnect module or a switch sub-system, which has number of PCIE based connection modules equal to or more than the number of systems to be interconnected, in this case of FIG. 1 this number being eight {(1b) to (8b)}, that can be interconnected for data transfer through the switch. A software based control input is provided to configure and/or control the operation of the switch and enable connections between the switch ports for transfer of data. Link connections {(1L) to (8L)} attach the PCIE based peripheral modules 1a to 8a, enabled for interconnection on the respective systems 1 to 8, to the on the switch with n links. The value of n can vary depending on the connect band width required by the system.

When data has to be transferred between say system 1 and system 5, in the simple case, the control is used to establish an internal link between PCIE based peripheral modules 1b and 5b at the respective ports of the switch. A hand shake is established between outbound communication enabled PCIE based peripheral module (PCIE Module) 1a and inbound PCIE module 1b at the switch port and outbound PCIE module 5a on the switch port and inbound communication enabled PCIE module 5b. This provides a through connection between the PCIE modules 1a to 5b through the switch allowing data transfer. Data can then be transferred at speed between the modules and hence between systems. In more complex cases data can also be transferred and queued in storage implemented in the switch, at the ports and then when links are free transferred out to the right systems at speed.

Multiple systems can be interconnected at one time to form a multi-system that allow data and information transfer and sharing through the switch. It is also possible to connect smaller clusters together to take advantage of the growth in system volume by using an available connection scheme that interconnects the switches that form a node of the cluster.

If need for higher bandwidth and low latency data transfers between systems increase, the connections can grow by increasing the number of links connecting the PCIE modules between the systems in the cluster and the switch without completely changing the architecture of the interconnect. This scalability is of great importance in retaining flexibility for growth and scaling of the cluster.

It should be understood that the system may consist of peripheral devices, storage devices and processors and any other communication devices. The interconnect is agnostic to the type of device as long as they have a PCIE module at the port to enable the connection to the switch. This feature will reduce the cost of expanding the system by changing the switch interconnect density alone for growth of the multi-system.

PCIE is currently being standardized and that will enable the use of the existing PCIE modules to be used from different vendors to reduce the over all cost of the system. In addition using a standardized module in the system as well as the switch will allow the cost of software development to be reduced and in the long run use available software to configure and run the systems.

As the expansion of the cluster in terms of number of systems, connected, bandwidth usage and control will all be cost effective, it is expected the overall system cost can be reduced and overall performance improved by standardized PCIE module use with standardized software control.

Typical connect operation may be explained with reference to two of the systems, example system (1) and system (5). System (1) has a PCIE module (1a) at the interconnect port and that is connected by the connection link or data-link or link (1L) to a PCIE module (1b) at the IO port of the switch (9). System (5) is similarly connected to the switch trough the PCIE module (5a) at its interconnect port to the PCIE module (5b) at the switch (9) IO port by link (5L). Each PCIE module operates for transfer of data to and from it by standard PCI Express protocols, provided by the configuration software loaded into the PCIE modules and switch. The switch operates by the software control and configuration loaded in through the software configuration input.

Figure 2:
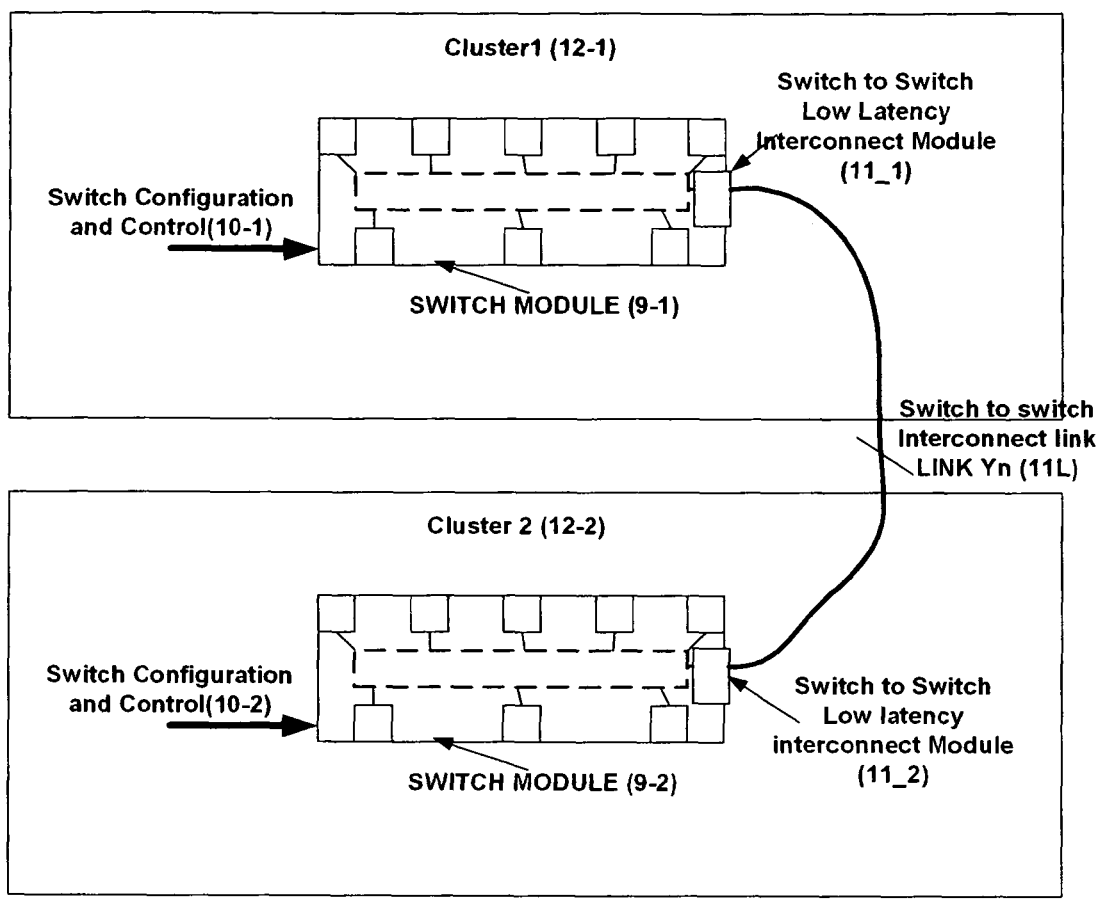
FIG. 2—is a cluster using multiple interconnect modules or switches to interconnect smaller clusters.

FIG. 2 is that of a multi-switch cluster. As the need tom interconnect larger number of systems increase, it will be optimum to interconnect multiple switches of the clusters to form a new larger cluster. Such a connection is shown in FIG. 2. The shown connection is for two smaller clusters (12-1 and 12-2) interconnected using PCIE modules that can be connected together using any low latency switch to switch connection (11-10 and 11-2), connected using interconnect links (11L) to provide sufficient band width for the connection. The switch to switch connection transmits and receives data and information using any suitable protocol and the switches provide the interconnection internally through the software configuration loaded into them.

The following are some of the advantages of the disclosed interconnect scheme 1. Provide a low latency interconnect for the cluster. 2. Use of PCI Express based protocols for data and information transfer within the cluster. 3. Ease of growth in bandwidth as the system requirements increase by increasing the number of links within the cluster. 4. Standardized PCIE component use in the cluster reduce initial cost. 5. Lower cost of growth due to standardization of hardware and software. 6. Path of expansion from a small cluster to larger clusters as need grows. 7. Future proofed system architecture. 8. Any speed increase in the switch and link connections due to technology advance is directly applicable to the interconnection scheme.

The circuit implementations can be any or a combination of Integrated-circuit, FPGA, Silicon on Chip (SOC), chip on board (COB), optical , or hybrid circuit implementations. In fact the disclosed interconnect scheme provides advantages for low latency multi-system cluster growth that are not available from any other source.

While the invention has been described in terms of several embodiments, those of ordinary skill in the art will recognize that the invention is not limited to the embodiments described, but can be practiced with modification and alteration within the spirit and scope of the appended claims. Multiple existing methods and methods developed using newly developed technology may be used to establish the hand shake between systems and to improve data transfer and latency. The description is thus to be regarded as illustrative instead of limiting and capable of using any new technology developments in the field of communication an data transfer. There are numerous other variations to different aspects of the invention described above, which in the interest of conciseness have not been provided in detail. Accordingly, other embodiments are limited only within the scope of the claims.

The invention claimed is:

1. A system for interconnecting in a cluster a plurality of PCI-Express (PCIE) enabled computers for communication and data transfer, the system comprising:

the plurality of PCIE enabled computers each comprising at least a root complex;

each of the root complexes, enabled to configure and control a respective PCIE I/O bus system including data transfer from connected peripheral devices connected via PCIE peripheral modules at the end points of the respective PCIE I/O bus system;

each of the plurality of PCIE enabled computers interconnected in the cluster also comprising a respective PCIE peripheral module configured as an I/O module, at a respective interconnect port enabled for system interconnection;

each of the respective PCIE peripheral modules at the end points of the respective PCIE I/O bus system respectively connects to a respective plurality of PCIE links, a bandwidth of respective connection defining the respective number of PCIE links of the respective connection;

a switch subsystem comprising a switch comprising a plurality of switch ports;

the switch comprising a plurality of PCIE based connection modules, each one of the plurality of connection modules at each respective switch port;

a number of the plurality of PCIE based connection modules being equal or more than a number of the plurality of PCIE enabled computers interconnected in the cluster, enabling a respective connection of each one of the PCIE peripheral modules configured as the I/O module, at the respective interconnect port enabled for system interconnection of each of the plurality of PCIE enabled computers, to a respective one of the plurality of PCIE based connection modules at the respective switch ports using the respective plurality of attached PCIE links, for data transfer to the respective switch port; and the switch subsystem further comprising a control input for software configuration and control of the switch and enabling software configuration and control of connections for data transfer and communication between the switch ports, wherein the control input to the switch subsystem is used to establish internal links between the plurality of PCIE based connection modules at the respective switch ports on the switch for communication and data transfer between the plurality of PCIE enabled computers interconnected in the cluster.

2. The system of claim 1, wherein each of the PCIE based connection modules at the respective switch ports are configured to connect to the plurality of attached PCIE links from the one of the plurality of PCIE peripheral modules configured as the I/O module at the respective interconnect port enabled for system interconnection of the respective one of the plurality of the PCIE enabled computers interconnected in the cluster.

3. The system of claim 2, wherein data transfers over each of the respective plurality of PCIE links are using standard PCIE protocols.

* * * * *